(12) United States Patent
Vernik et al.

(10) Patent No.: US 7,799,217 B2
(45) Date of Patent: Sep. 21, 2010

(54) SYSTEM FOR SOLVENT PURIFICATION

(75) Inventors: Dmitry Vernik, Los Angeles, CA (US); Ron Hood, Hawthorne, CA (US)

(73) Assignee: WEMS, Inc., Hawthorne, CA (US)

( * ) Notice: Subject to any disclaimer, the term of this patent is extended or adjusted under 35 U.S.C. 154(b) by 28 days.

(21) Appl. No.: 12/389,238

(22) Filed: Feb. 19, 2009

(65) Prior Publication Data

US 2009/0188391 A1    Jul. 30, 2009

Related U.S. Application Data

(62) Division of application No. 11/367,614, filed on Mar. 3, 2006, now Pat. No. 7,501,066.

(60) Provisional application No. 60/658,992, filed on Mar. 4, 2005.

(51) Int. Cl.
*C02F 1/00* (2006.01)

(52) U.S. Cl. ............... 210/167.01; 210/167.31; 210/194; 210/195.1; 210/263; 210/264

(58) Field of Classification Search ............ 210/167.01, 210/167.31, 194, 195.1, 263, 264
See application file for complete search history.

(56) References Cited

U.S. PATENT DOCUMENTS

| 3,538,168 | A | 11/1970 | Mitchell, Jr. |
|---|---|---|---|
| 4,351,732 | A | 9/1982 | Psaras et al. |
| 4,372,857 | A | 2/1983 | Matthews et al. |
| 4,868,346 | A | 9/1989 | Kiser |
| 6,333,268 | B1 | 12/2001 | Starov et al. |
| 6,444,121 | B1 | 9/2002 | Maxwell |
| 6,478,953 | B2 | 11/2002 | Spearman et al. |
| 6,589,444 | B2 | 7/2003 | Thomas et al. |
| 2005/0258096 | A1 * | 11/2005 | Stafford et al. .............. 210/634 |

FOREIGN PATENT DOCUMENTS

JP    62-10108 A    1/1987

OTHER PUBLICATIONS

The Supplementary European Search Report, dated Jan. 26, 2010, for European Application No. EP 06 73 6886, Filed Mar. 3, 2006.
International Search Report mailed on Jul. 13, 2007 for International Application No. PCT/US 06/07637.
Pangborn, et al., "Safe and Convenient Procedure for Solvent Purification," Organometallics, 15:15-18-1520, 1996.
"Technical Data—Liquid Phase Drying of Organic Liquids With a Column of Granular Drierite," published at http://www.drierite.com/default.cfm not later than Dec. 11, 2004 (per http://web.archive.org/web/20041211234603/http://www.drierite.com/default.cfm) (downloaded from web on Jun. 10, 2008).

* cited by examiner

*Primary Examiner*—Chester T Barry
(74) *Attorney, Agent, or Firm*—Christie, Parker & Hale, LLP (57) ABSTRACT

A system and a method for solvent purification is provided. The system includes a solvent storage tank and a filter coupled to the tank for filtering out moisture from the solvent. The method includes providing a tank to hold the solvent being purified, providing a filter coupled to the tank, and repeatedly providing solvent from the tank to the filter, and filtering the solvent to remove moisture and returning the filtered solvent to the tank.

22 Claims, 6 Drawing Sheets

SYSTEM FOR SOLVENT PURIFICATION

CROSS-REFERENCE TO RELATED APPLICATION(S)

This application is a divisional of application Ser. No. 11/367,614 filed on Mar. 3, 2006, now U.S. Pat. No. 7,501,066, based upon and claims priority on U.S. Provisional Application No. 60/658,992, filed on Mar. 4, 2005 the contents of which are fully incorporated herein by reference.

BACKGROUND OF THE INVENTION

The present invention is directed to a method and a system for solvent purification. Synthetic and organo-metallic chemistry for example requires very high purity solvents. More specifically, synthetic chemistry requires solvents which are deplete of oxygen and moisture content. Organo-metallic chemistry requires solvents which even have a higher purity as to moisture content. In other words, the solvent needs to be "dry" before it can be used.

A traditional method for purifying or "drying out" solvents is thermal distillation. Because solvents are very volatile, thermal distillation presents a significant fire and explosion hazard. In addition, it is a very inefficient method for drying out the solvent. Typically, distillation involves use of a suitable drying agent. A typical drying agent may be Li, Na, K, $CaH_2$, and $LiA_1H_4$. These drying agents are highly reactive and as such are quite dangerous. Over the years there have been many fires and explosions involving thermal distillations of solvents. Chemists characterize thermal distillation as one of the most dangerous routine procedures they perform. Moreover, the maintenance of distillation equipment and the quenching of the drying agents are very laborious.

Another purification method uses the so-called "Grubbs apparatus" which uses a very large solvent reservoir and alumina/catalyst columns to dry and de-oxygenate solvents to the desired level of purity, without using heat or water reactive drying agents. The Grubbs apparatus takes up a lot of laboratory and research space. The system uses a large storage drum holding 15-20 liters of solvent and purification columns or cylinders that are typically over 30 inches tall and have a diameter greater than 3 inches. Multiple columns are used and are connected in series. Each of the column contains an activated filter media that removes contaminates from a solvent as it passes through the column. The solvent is passed only once through the columns to get filtered. By the time the solvent reaches the end of the last column, the solvent is sufficiently filtered.

Filling of the drum reservoir with a solvent typically occurs under a fume hood for the purpose of evacuating all hazardous solvent fumes. Solvents may be provided in 4 liter containers. Thus, multiple containers must be used to fill the drum. Solvents may also be provided in larger containers, as for example, 10 or 20 liter containers. Such containers are typically heavy. Moreover, it may be difficult or impossible to empty such containers into the drum reservoir while under a fume hood.

Furthermore, after use, each of the long columns must be regenerated, i.e., the contaminates which had been filtered out from the solvent must be removed from the columns. This may be quite difficult as the cylinders are long. The problem with the Grubb system is that it is not portable and due to its size it is confined to the space upon where the system is housed.

SUMMARY OF THE INVENTION

In an exemplary embodiment a portable system for solvent purification is provided. The system includes a solvent storage tank for holding a solvent and a filter coupled to the tank for filtering out moisture from the solvent. The filter has an inlet for receiving solvent from the storage tank and an outlet from which filtered solvent flows to the storage tank. An inert gas source is coupled to the tank for providing an inert gas into the tank. In another exemplary embodiment, the filter is generally cylindrical filter cartridge having a length of about 17 inches and a diameter of about 3 inches. In a further exemplary embodiment, the filter includes alkaline metal alumino-silicate or another adsorbent agent. In yet another exemplary embodiment, the storage tanks holds about four liters of solvent.

In yet a further exemplary embodiment, the system also includes a first valve coupled to the inert gas source for controlling the flow of inert gas to the tank. In yet a further exemplary embodiment, the system includes an outlet, a vacuum source, and a second valve coupled to the vacuum source and the inert gas source for controlling the vacuum applied to, and the flow of inert gas to, the outlet.

In another exemplary embodiment, the system also includes a pump for urging the solvent from the storage tank to the filter. In yet another exemplary embodiment the system also includes a second solvent storage tank and a second filter coupled to the second tank for filtering out moisture from a second solvent. The second filter has an inlet for receiving solvent from the second storage tank and an outlet from which filtered solvent is received back from the second filter to the second storage tank. A second pump is also included with the system for urging the second solvent from the second storage tank to the second filter. The two pumps are both driven by a single motor.

In another exemplary embodiment, a portable system for solvent purification is provided including a solvent storage tank for holding a solvent, a filter coupled to the tank for filtering out moisture from the solvent, the filter having an inlet for receiving solvent from the storage tank and an outlet from which filtered solvent flows to the storage tank, and means coupled to the tank for removing oxygen from the solvent. In an exemplary embodiment, the means includes a filter coupled to the tank for removing oxygen from the solvent. The filter may include a copper alumina catalyst.

In another exemplary embodiment, the system further includes glass-ware preparation means coupled to the tank for decontaminating the glass-ware used to collect a sample of filtered solvent. In one exemplary embodiment, the glass-ware preparation means includes a nipple, an inert gas source, a vacuum source, and a valve coupled to the inert gas source and to the vacuum source for controlling the flow of inert gas and the vacuum to the nipple.

In a further exemplary embodiment, the filter is generally cylindrical filter cartridge having a length of about 17 inches and a diameter of about 3 inches. The filter may include alkaline metal alumino-silicate or another adsorbent agent. In yet another exemplary embodiment, the storage tanks holds about four liters of solvent.

In another exemplary embodiment, a method for solvent filtering is provided. The method includes providing a tank to hold the solvent being filtered, providing a filter coupled to the tank, and repeatedly providing solvent from the tank to the filter, filtering the solvent to remove moisture and returning the filtered solvent to the tank. The method may further include removing oxygen from the solvent. In one exemplary embodiment, this may be accomplished by providing an inert gas into the tank and purging the tank with the inert gas. In another exemplary embodiment, this may be accomplished by filtering the solvent through a filter including a copper aluminum catalyst.

The tank and filter may form a system. The method may include filtering a batch of solvent at a first location, moving the system to a second location, different from the location in which the filtering took place and filtering another batch of solvent through the system. Furthermore the method may include filling the storage tank with the solvent while the system is under an operating fume hood.

DETAILED DESCRIPTION OF THE INVENTION

The present invention provides a method and a system for solvent purification. In an exemplary embodiment, the system is a portable system 10, as for example shown in FIG. 1A. The exemplary system includes a storage tank 12 (best seen in FIGS. 2A and 2B) that holds just a little more than four liters. This is optimal as most solvents are supplied in four liter bottles. The exemplary system is also modular.

A chemical resistance pump 15 (shown schematically in FIG. 2A) such as magnetic resistance pump driven by a motor may be coupled to the system via circulation pump connection lines 14a, 14b. A filter cartridge 16 is coupled to the reservoir via quick locking and unlocking connections 18a, 18b. In an exemplary embodiment, the cartridge is about twelve inches long and has a diameter of about 1½ inches.

The storage tank includes an inlet 20 for receiving the solvent. The system is also provided with an inert gas sparge valve 22, a vacuum/inert gas selection valve 24, and a sample out valve 26. In an exemplary embodiment, the inert gas sparge valve is a two position valve, i.e., an on/off type of valve. An exemplary inert gas sparge valve is a two-way valve made by Swaglok Company. The vacuum/inert gas valve in an exemplary embodiment is valve that can be used to select between a vacuum, inert gas and an off position. An exemplary vacuum/inert gas valve is a three-way valve made by Swaglok Company. The sample out valve in an exemplary embodiment, is a three-way valve made by Swaglok Company.

Figure 3:
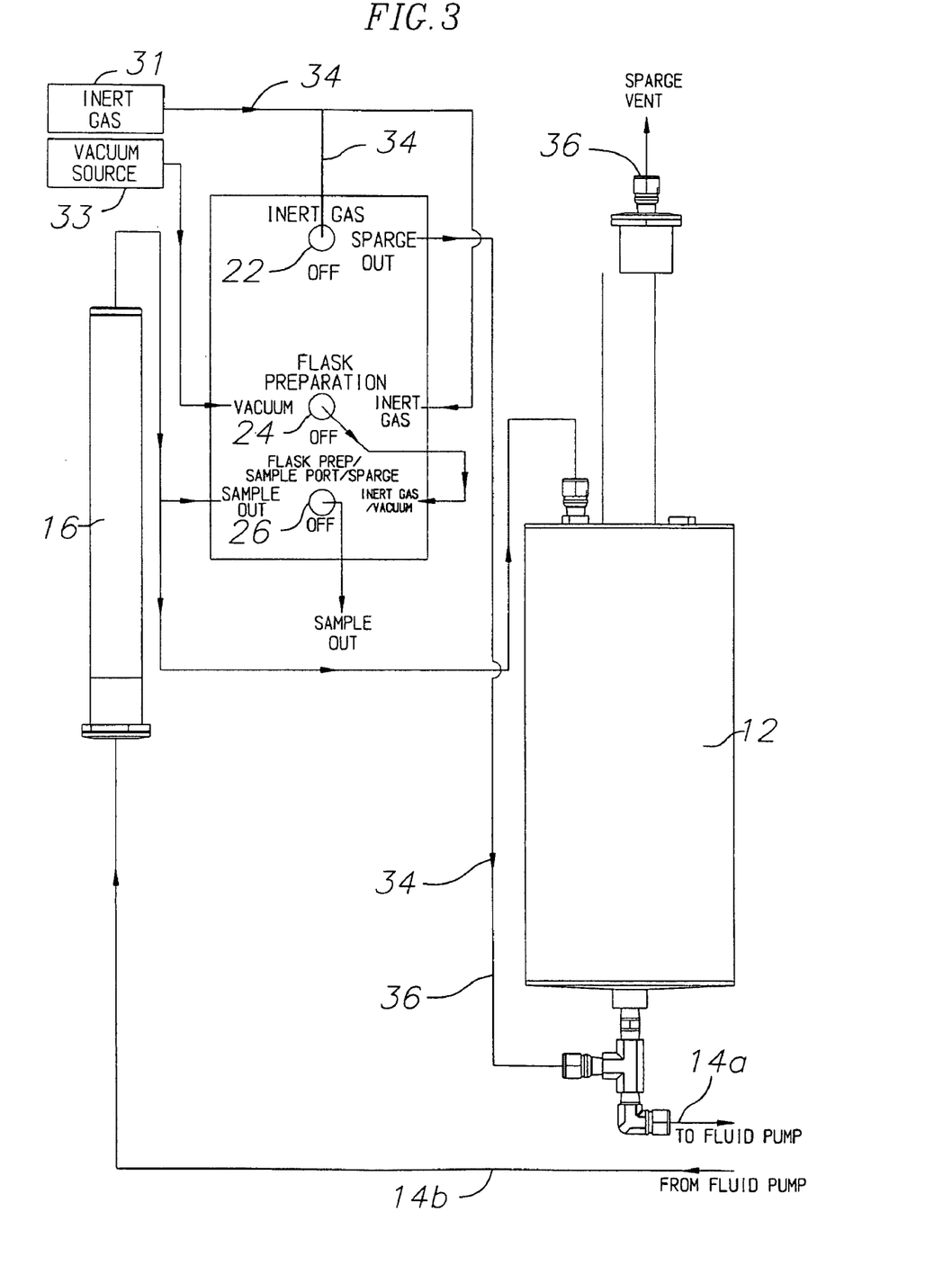
FIG. 3 is a schematic view of an exemplary embodiment system of the present invention.

Solvent exits the storage tank through line 14a and its pumped via the pump through line 14b through the cartridge and back to the storage tank 12, as for example shown schematically in FIG. 3. Lines 14a and 14b are the circulation pump connection lines. The solvent travels through line 14b, through line 13, through the cartridge 16, through lines 15 and 17 and back into the storage tank. The system continues to circulate the solvent through the cartridge until the solvent is sufficiently purified of moisture. In an exemplary embodiment, the cartridge consists of Molsiv® adsorbent type 13X made by UOP Company. Molsiv absorbent type 13X is an alkaline metal alumino-silicate. Other adsorbent agents may also be used as the filtering media, as for example UOP 3A-PCG Molsiv® adsorbent or UOP A-201 Activated Alumina.

In addition, a flow path is provided from the cartridge 16 via line 15 through the sample out valve 26, through the vacuum/inert gas selection valve 24 and through the inert gas sparge valve 22 through line 36 and into line 14a bypassing the storage tank.

Figure 1A:
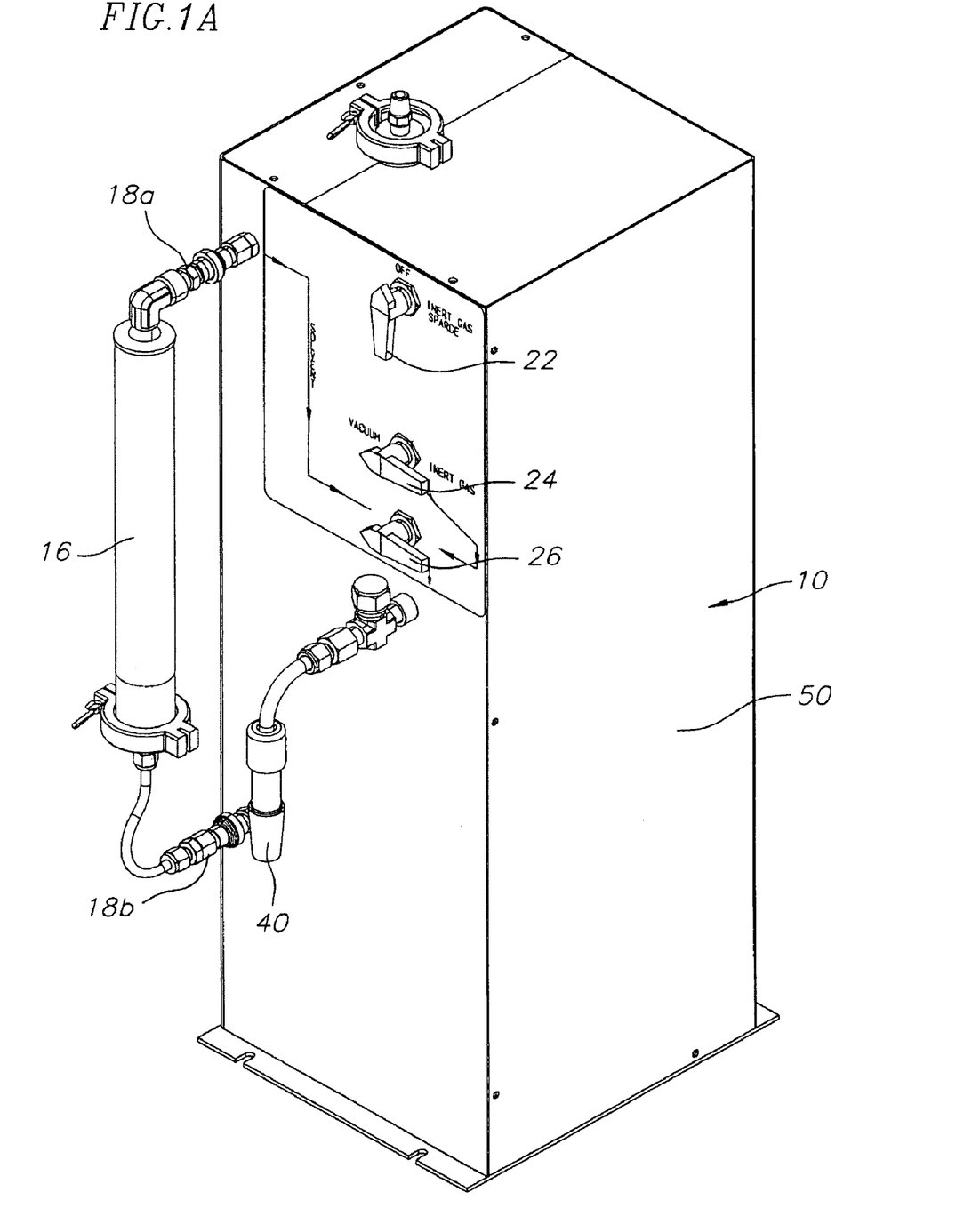
FIG. 1A Is a front prospective view of an exemplary embodiment system of the present invention.
Figure 1B:
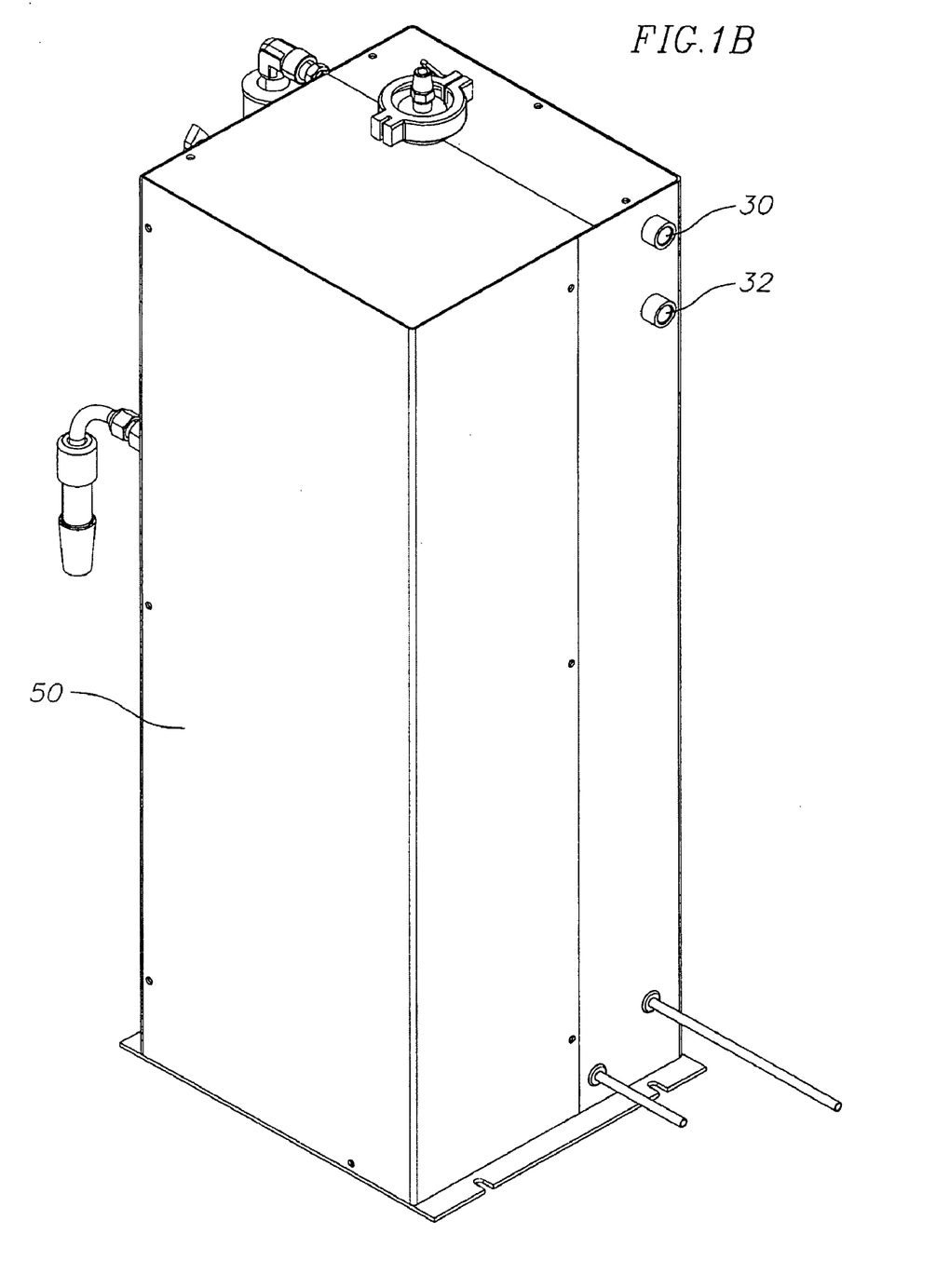
FIG. 1B Is a rear prospective view of an exemplary embodiment system of the present invention.
Figure 2A:
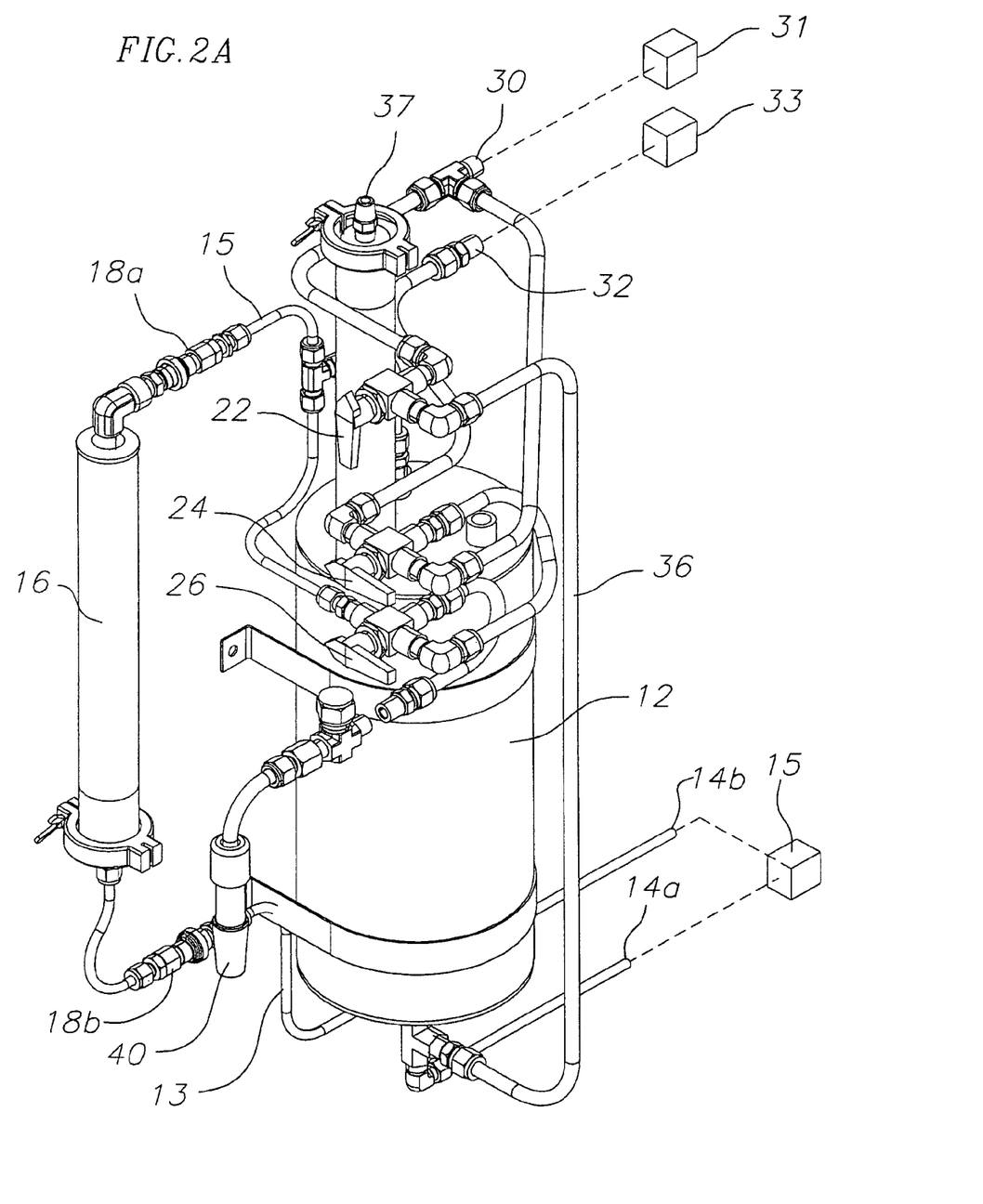
FIGS. 2A and 2B are front and rear prospective views of the inner components of the exemplary embodiment system shown in FIG. 1A.
Figure 2B:
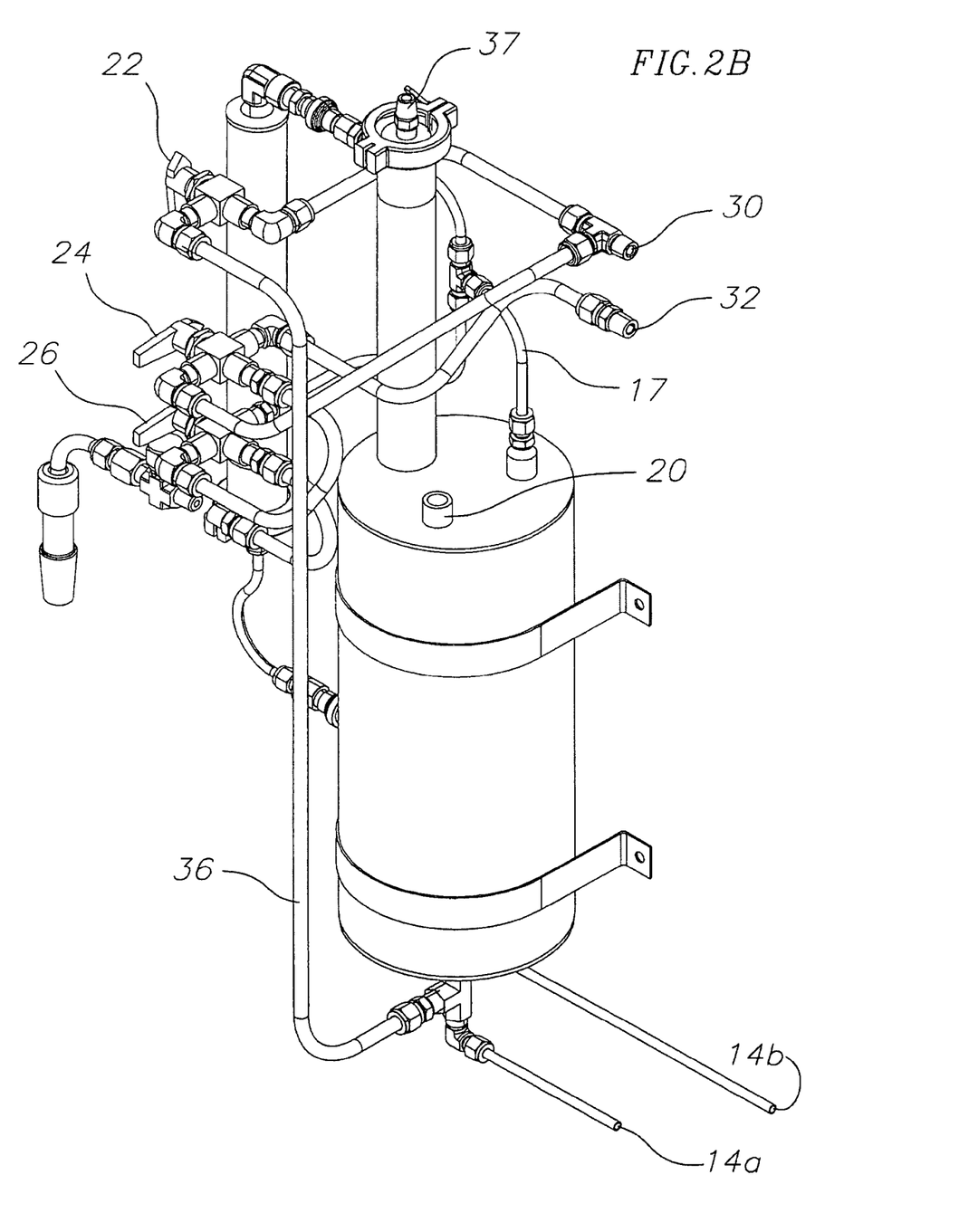

The exemplary system also includes an inert gas inlet 30 coupled to the inert gas sparge valve 22, and the vacuum/inert gas selection valve 24 as well as a vacuum source inlet 32 coupled to vacuum/inert gas selection valve 24 as for example shown in FIGS. 1B, 2A and 2B. The inert gas inlet 30 receives inert gas from an inert gas source 31 shown schematically in FIG. 2A. The vacuum source inlet 32 receives vacuum from a vacuum source 33 shown schematically in FIG. 2A. The exemplary embodiment system is mounted within a housing 50 as shown in FIGS. 1A and 1B.

In an exemplary embodiment system, oxygen is removed from the solvent by sparging the system. Sparging is accomplished by running an inert gas such as nitrogen through the solvent in the storage tank. Nitrogen forms bubbles within the solvent that encapsulate the oxygen within the solvent. The bubbles rise to the top of the storage tank. To remove the oxygen from the solvent using the exemplary system, the inert gas sparge valve 22 is moved to a sparge position allowing inert gas from the inert gas source 31 coupled to the inert gas inlet 30 to flow through the sparge valve 22 to enter through the bottom of the storage tank as shown schematically in FIG. 3 by arrows 34 and through line 36 shown in FIGS. 2A and 2B. In an exemplary embodiment, during sparging, the pump is off thereby allowing the nitrogen to flow upward into the tank rather than being circulated through the cartridge 16. The inert gas forms bubbles which encapsulate the oxygen. The bubbles rise to the top of the storage tank 12. A sparge vent 37 is coupled to an upper end of the storage tank allowing the bubbles with the oxygen to escape. In an exemplary embodiment, it takes about ten to fifteen minutes depending on the solvent to satisfactorily remove the oxygen from the solvent. In other words, for fifteen minutes inert gas is supplied to the storage tank and the nitrogen bubbles carrying oxygen is vented through this sparge vent.

Figure 4:
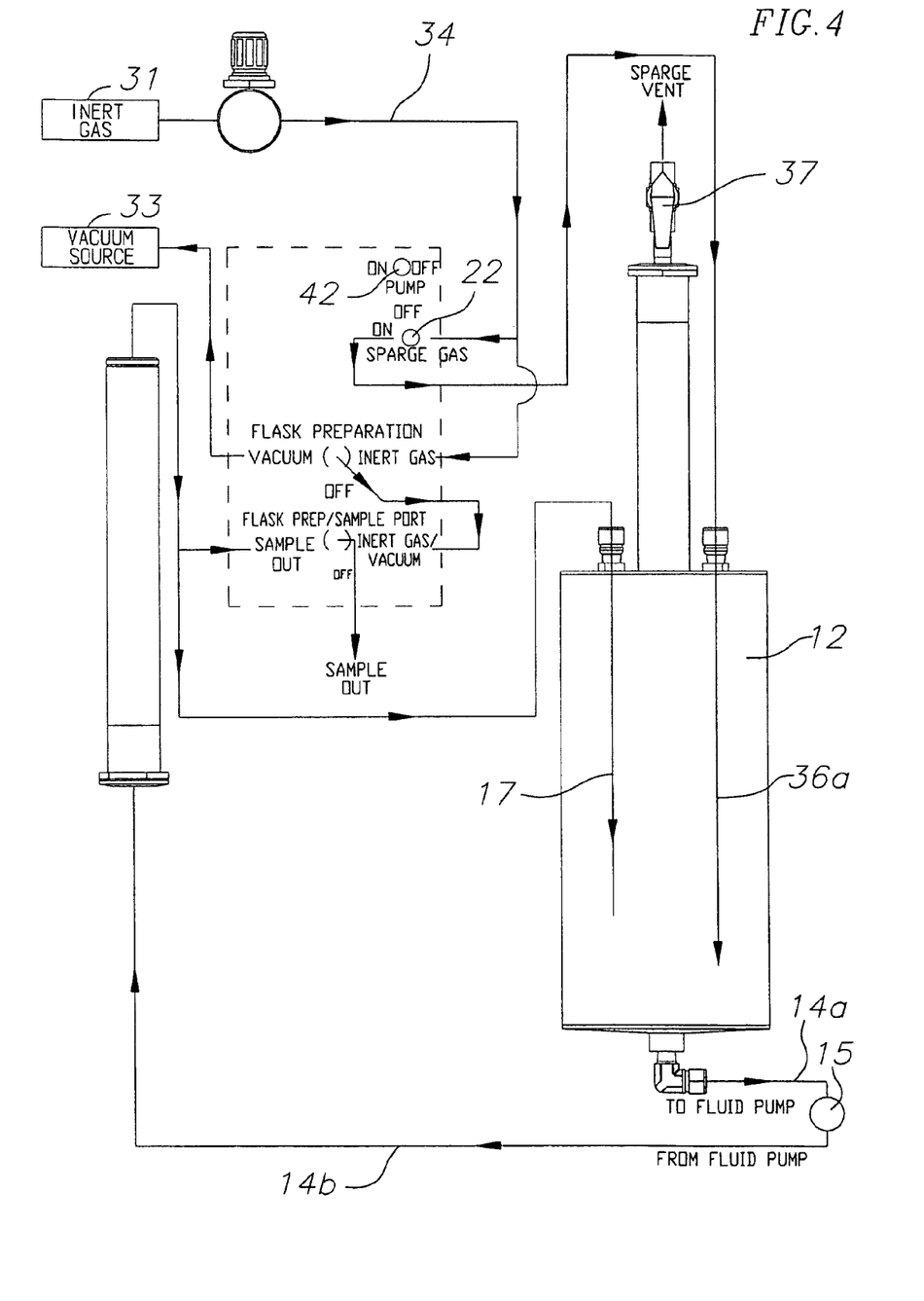
FIG. 4 is a schematic view of another exemplary embodiment system of the present invention.

In another exemplary embodiment, instead of providing the inert gas to the bottom of the tank through a line 36 that is external of the tank, the inert gas may be provided through a line 36a that enters the tank 12 through the top of the tank and extends to the lower portion of the tank 12, as for example shown in FIG. 4. Furthermore, the exemplary embodiment system may be provided with a switch such as switch 42 to turn on and off the pump 15 used to pump the solvent from the tank 12 to the filter 16.

In an alternate exemplary embodiment, instead of inert gas, another cartridge having a copper alumina catalyst is used to remove the oxygen. One such cartridge may be a Q-5 filter cartridge by Engelhard Corp. In this embodiment, solvent is run through the moisture absorbent cartridge 16 and is also run through the oxygen removing cartridge. These two cartridges may be in series with each other.

To ascertain whether the solvent is sufficiently purified, a sample of the solvent in the system may have to be taken and measured. The exemplary embodiment system may also include a glass-ware, such as a flask, preparation system for decontaminating the glass-ware to be used for collecting a solvent sample to be measured so that the glass-ware maintains the integrity of the sample collected. A glass-ware preparation system nipple 40 (FIGS. 1A and 2A) is coupled to the system. More specifically, the nipple 40 is coupled to the inert gas source 31 and to the vacuum source 33 via the inert gas/vacuum valve 24. The nipple is also coupled to the cartridge 16 (as shown in FIG. 2A) or the storage tank via the sample out valve 26. In an exemplary embodiment, a glassware which is to receive the sample is mated to the nipple. The vacuum and inert gas valve is then cycled between an inert gas position allowing the inert to enter the glass-ware and a vacuum position whereby the impurities in the glass-ware including the inert gas are removed by vacuum provided by the vacuum source coupled to vacuum inlet 32. The inert gas sanitizes, i.e., decontaminates the glass ware and the vacuum helps to remove the inert gas with any contaminants. The cycling of the valve may be done manually or in an alternative exemplary embodiment may be done automatically using any appropriate mechanism.

Once the glass-ware has been prepared, i.e., decontaminated using inert gas and vacuum, the vacuum/inert gas valve 24 is turned off and the sample out valve 26 is turned on allowing solvent downstream from the cartridge in the exemplary embodiment (or from the storage tank in an alternate exemplary embodiment or from another line coupled to either the cartridge or the storage tank) to exit the nipple and enter the glass-ware. The glass-ware is then covered with a decontaminated cover or cap and the sample is taken into a glove box where the solvent within the glass-ware is accessed in a clean environment for testing for ascertaining the amount of impurities within the solvent, i.e., the purity of the solvent. The purity of the solvent may be measured using known methods as for example the Karl Fisher titration method.

After multiple uses, the filter cartridge 12 may be easily changed as necessary by disengaging from the system using the quick connect and disconnect fittings 18a, 18b. A new cartridge may then be easily connected using the quick connect and disconnect fittings. The cartridge 12 may be made to be disposable. Alternatively a non-disposable cartridge may be used which after being sufficiently used may be taken to the appropriate facilities for being regenerated or cleaned.

An advantage of the exemplary embodiment system is that it is modular. For example, a single motor may be used to drive multiple systems. In other words, a single motor may be coupled to pump heads or circulation pumps coupled to the circulation pump connection lines of multiple systems. These connections may be accomplished using quick connect and disconnect fittings.

As can be seen, the exemplary embodiment system includes a mounting structure, the solvent storage or tank, a purification cartridge and the associated valving and plumbing. The construction of this system is modular and the size is optimized for research and small production environments. Moreover, by using multiple systems, large production environments may also be satisfied. The exemplary system is also compact enough to be easily transported to a fume hood, if necessary.

Applicant believes that a solvent can be purified using the exemplary system to levels down to 1 ppm or less than 1 ppm of moisture and oxygen. Other advantages of the exemplary system is that cartridge replacement does not require dismantling of the system. The cartridges are expected to be low-priced and easy to replace. The exemplary system is also able to produce pure solvent on demand.

The system may be provided with a menu of recommended circulation or filtering times or cycles for the purification of different types of solvents. In other exemplary embodiments, the system may be automated for the various types of solvents. In this regard, the operator may just push a button or make a selection otherwise of a particular solvent from a menu which may be electronic and the system remove the oxygen and circulate the solvent sufficient times to reach the desired purification level for the selected solvent. In other exemplary embodiments the system may provide for selections of various levels of purification for various solvents.

The exemplary embodiment system may be used to remove oxygen and/or moisture from solvents. In an alternate exemplary embodiment, the flow through the cartridge 16, and/or through an oxygen removing cartridge may be in reverse from that described herein.

The exemplary system is able to filter solvents, for example it is able to "dry" solvents by circulating the solvents through the appropriate medium. By being able to circulate the solvent through the filtering medium multiple times the size of the exemplary embodiment system including the filter medium is minimized.

What is claimed is:

1. A system for solvent purification comprising:
a solvent storage tank for holding a solvent; and
a filter coupled to the tank for filtering out moisture from the solvent, the filter having an inlet for receiving solvent from the storage tank and an outlet from which filtered solvent flows to the storage tank
wherein said system is portable and has a size allowing it to fit in a fume hood, and wherein said system is capable of filtering out moisture from the solvent to a level of not greater than 1 ppm of moisture.

2. The system as recited in claim 1 wherein the filter is generally cylindrical filter cartridge having a length of about 17 inches and a diameter of about 3 inches.

3. The system as recited in claim 1 further comprising an inert gas source coupled to the tank for providing an inert gas to the tank.

4. The system as recited in claim 1 wherein the filter comprises an adsorbent agent.

5. The system as recited in claim 1 wherein the storage tanks holds about four liters of solvent.

6. The system as recited in claim 3 further comprising a valve controlling the flow of inert gas into the tank.

7. The system as recited in claim 6 further comprising:
an outlet;
a vacuum source; and
a second valve coupled to the vacuum source and the inert gas source for controlling vacuum from the vacuum source and the flow of inert gas to the outlet.

8. The system as recited in claim 1 further comprising:
an outlet;
a vacuum source; and
a valve coupled to the vacuum source and the inert gas source for controlling vacuum from the vacuum source and the flow of inert gas to the outlet.

9. The system as recited in claim 1 further comprising a pump for repeatedly circulating the solvent between the storage tank and the filter.

10. The system as recited in claim 1 further comprising a
a second solvent storage tank for holding a second solvent;
a second filter coupled to the second tank for filtering out moisture from the second solvent, the filter having an inlet for receiving solvent from the second storage tank and an outlet from which filtered solvent flows to the second storage tank; and a second pump for urging the second solvent from the second storage tank to the second filter, wherein the pump and the second pump are both driven by a single motor.

11. A system for solvent purification comprising:
a solvent storage tank for holding a solvent;
a filter coupled to the tank for filtering out moisture from the solvent, the filter having an inlet for receiving solvent from the storage tank and an outlet from which filtered solvent flows to the storage tank; and
means coupled to the tank for removing oxygen from the solvent, wherein the system is portable, wherein said system has a size allowing it to fit in a fume hood, and wherein said system is capable of filtering out moisture from the solvent to a level of not greater than 1 ppm of moisture.

12. The system as recited in claim 11 wherein the means comprises a second filter for removing oxygen from the solvent, said filter being coupled to the tank.

13. The system as recited in claim 12 wherein said second filter comprises a copper alumina catalyst.

14. The system as recited in claim 11, wherein said means comprises an inert gas source for providing inert gas to the solvent within the storage tank.

15. The system as recited in claim 11 further comprising glass-ware preparation means coupled to the tank for decontaminating glass-used used to collect a sample of filtered solvent.

16. The system as recited in claim 15 wherein the glass-ware preparation means comprises:
a nipple;
an inert gas source;
a vacuum source; and
a valve coupled to the inert gas source and to the vacuum source for controlling the flow of inert gas from the inert gas source and vacuum from the vacuum source to the nipple.

17. The system as recited in claim 15 wherein the filter is generally cylindrical filter cartridge having a length of about 17 inches and a diameter of about 3 inches.

18. The system as recited in claim 15 wherein the filter comprises alkaline metal alumino-silicate.

19. The system as recited in claim 15 wherein the storage tanks holds about four liters of solvent.

20. The system as recited in claim 11 wherein the filter is generally cylindrical filter cartridge having a length of about 17 inches and a diameter of about 3 inches.

21. The system as recited in claim 11 wherein the system is capable of removing oxygen from the solvent to a level of not greater than 1 ppm of oxygen.

22. The system as recited in claim 11 further comprising a pump for repeatedly circulating the solvent between the storage tank and the filter.

* * * * *

UNITED STATES PATENT AND TRADEMARK OFFICE
CERTIFICATE OF CORRECTION

PATENT NO. : 7,799,217 B2  Page 1 of 1
APPLICATION NO. : 12/389238
DATED : September 21, 2010
INVENTOR(S) : Dmitry Vernik et al.

It is certified that error appears in the above-identified patent and that said Letters Patent is hereby corrected as shown below:

In the Claims

Column 6, Claim 2, line 32       After "is"
                                 Insert -- a --

Column 6, Claim 5, line 41       Delete "tanks"
                                 Insert -- tank --

Column 8, Claim 17, line 10      After "is"
                                 Insert -- a --

Column 8, Claim 19, line 16      Delete "tanks"
                                 Insert -- tank --

Column 8, Claim 20, line 17      After "is"
                                 Insert -- a --

Signed and Sealed this
Twenty-third Day of August, 2011

David J. Kappos
*Director of the United States Patent and Trademark Office*